(12) United States Patent
Swoboda et al.

(10) Patent No.: US 6,647,511 B1
(45) Date of Patent: Nov. 11, 2003

(54) RECONFIGURABLE DATAPATH FOR PROCESSOR DEBUG FUNCTIONS

(75) Inventors: Gary L. Swoboda, Sugarland, TX (US); Madathil R. Karthikeyan, Bangalore (IN); Amitabh Menon, Bangalore (IN); David R. Matt, Missouri City, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/379,769

(22) Filed: Aug. 24, 1999

Related U.S. Application Data

(60) Provisional application No. 60/100,712, filed on Sep. 17, 1998.

(51) Int. Cl.[7] .................................................. G06F 11/00
(52) U.S. Cl. ........................ 714/30; 714/733; 714/734
(58) Field of Search ................................. 714/723, 733, 714/734, 30, 27, 40

(56) References Cited

U.S. PATENT DOCUMENTS

| | | | | | |
|---|---|---|---|---|---|
| 5,338,984 | A | * | 8/1994 | Sutherland | ................... 326/41 |
| 5,974,435 | A | * | 10/1999 | Abbott | ....................... 708/523 |
| 6,058,469 | A | * | 5/2000 | Baxter | ......................... 712/43 |
| 6,282,627 | B1 | * | 8/2001 | Wong et al. | .................. 712/15 |
| 6,510,530 | B1 | * | 1/2003 | Wu et al. | ..................... 714/30 |

* cited by examiner

Primary Examiner—Robert Beausoliel
Assistant Examiner—Marc Duncan
(74) Attorney, Agent, or Firm—Bret J. Petersen; W. James Brady, III; Frederick J. Telecky, Jr.

(57) ABSTRACT

A reconfigurable datapath (13b), which may be alternatively configured for various debug modes. These modes include a breakpoint mode (20), counter mode (30a–30c), DMA mode (40), and PSA mode (50). Each configuration uses one or more of two bitcell units: a register bitcell unit (60) and a comparator bitcell unit (70). The inputs and interconnections of these bitcell units (60, 70) determine the configuration, and hence the mode, for which they are to be used.

32 Claims, 4 Drawing Sheets

RECONFIGURABLE DATAPATH FOR PROCESSOR DEBUG FUNCTIONS

This application claims the benefit of provisional application No. 60/100,712, filed Sep. 17,1998.

TECHNICAL FIELD OF THE INVENTION

This invention relates to digital processors, and more particularly to development tools for such processors.

BACKGROUND OF THE INVENTION

Microprocessors have found their way into a huge variety of products. Often the processor and its programming is completely "embedded" into the design of the device, hence the term "embedded processors" to describe such processors. Several examples of devices having embedded processors are cellular telephones, computer printers, high performance disk drives for computer data, and automobile control systems.

Development tools that are useful for general purpose (non-embedded) processors are not satisfactory for embedded processor development. In other words, the test procedures for production of the processor itself may not be satisfactory for testing the processor in its embedded environment. It is more difficult to have visibility into processor operation. To solve this problem, one technique that is being increasingly used is referred to as "emulation".

In general, an emulator, whether software or hardware, permits direct control by a designer over a target processor. Because it is the application in which the processor will be used, and not the processor itself, that is being designed, the emulator must emulate the processor's operation.

In-circuit emulation, commonly referred to as ICE, uses emulators that are typically a combination of hardware and software. The emulator is typically connected between the embedded processor and a host CPU that is running debugging software. The emulation is "in-circuit" in the sense that the processor may be connected to the emulator while it is embedded into the system in which it is to be embedded.

Real-time in-circuit emulation permits a software designer to monitor, analyze, and modify code without impacting operation of the device in which the processor is embedded. The behavior of the emulator is identical to that of the target processor. For example, in the case of an embedded processor for a disk drive, the emulator might permit the designer to modify the code while the disk drive continues to run normally.

SUMMARY OF THE INVENTION

One aspect of the invention is a reconfigurable datapath that can provide multiple debug functions. The datapath is comprised of the following elements: a first set of register bitcells that form a reference register bitcell unit, a second set of register bitcells that form a mask register bitcell unit, and a set of comparator bitcells that form a comparator bitcell unit. Each of the register bitcells has a half adder, a register input multiplexer for selecting between a number of inputs, at least one said input being a counter input from the half adder and at least one input being a write input, and a flip flop for storing a selected one of the inputs. The half adder receives a carry chain input and the output of the flip-flop. Each of the comparator bitcells has NOR logic for receiving a bus input and a mask input, as well as XOR logic that receives the output of the NOR gate and a signal from the reference register unit. The XOR logic provides a compare result signal that is used differently (or not used) depending on the debug mode for which the datapath is configured. The interconnections between the bitcell units and their inputs determine whether the datapath is to be used in a breakpoint mode, counter mode, DMA (direct memory access) mode, or PSA (parallel signature analysis) mode.

An advantage of the invention is that debug functions are implemented with a single reconfigurable datapath, rather than with a different module for each function. The cost of the debug logic is reduced. The different modes can be configured on the fly, by changing the contents of a configuration register. The reconfigurable datapath may be used in conjunction with a software debug system or as part of a "self-debug" unit of a processor.

DETAILED DESCRIPTION OF THE INVENTION

Overview of Emulation System

Figure 1:
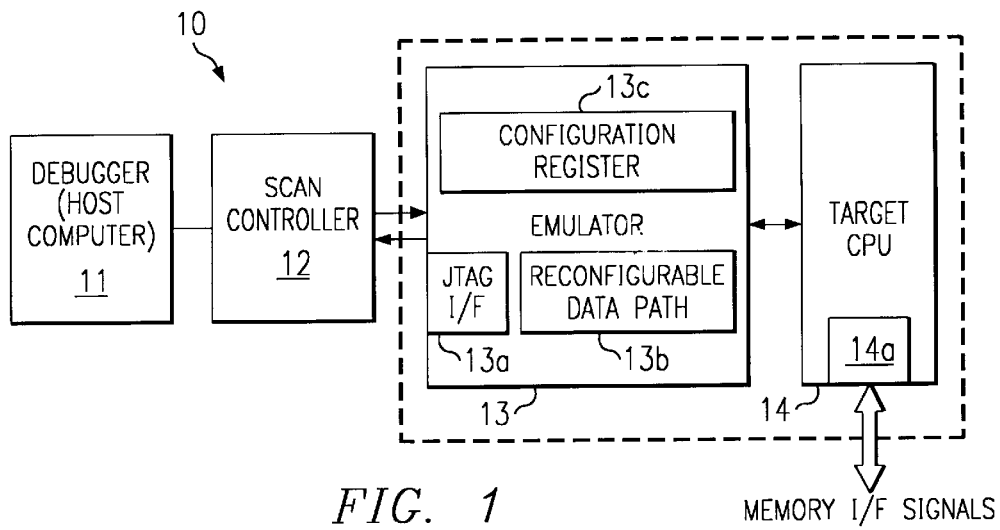
FIG. 1 is a block diagram of an emulation system having a reconfiguration datapath and configuration register in accordance with the invention.

FIG. 1 is a block diagram of an emulation system 10 for an embedded CPU 14. Emulation system 10 is comprised of debug software executable on a host computer (debugger 11), a scan controller 12, and emulation logic (emulator 13).

Emulation system 10 is an in-circuit emulation system, that is, it is used for developing a particular application in which CPU 14 is to be used. For example, an applications developer might be designing an application such as a new cellular phone whose functions will be controlled by the processor 14. The programming under development is referred to herein as the "target" application code. Although not shown in FIG. 1, CPU 14 may have various connections to other parts of the application system in which it is to be embedded.

Execution of the programming being tested is under the control of debugger 11. More specifically, debugger 11 receives the output from an emulation process and transfers this output to emulator 13. It is through the user interface of debugger 11 that the developer interacts with emulator 13 to control and monitor the operation of CPU 14 as it executes the target application code.

Many variety of debugger software exist, but in general the debugger 11 provides at least an interface for the designer to input commands. Typically, the debugger 11 also provides displays of program execution, including values of variables, arrays, structures, pointers,and registers. Memory contents can typically be displayed and edited. Using a debugger 11, the contents of a register or other memory can be changed and the program restarted with new data. The debugger 11 may permit instructions to be executed one at a time or to be stopped at a specified instruction.

The commands issued by the debugger 11 are translated into serial bit patterns by scan controller 12. Scan controller 12 then provides these bit patterns to emulator 13 through a JTAG interface 13a associated with emulator 13. Results of commands and other messages from CPU 14 are sent back to debugger 11 through the same JTAG interface 13a and through scan controller 12. Scan controller 12 may be any one of a number of commercially available devices that convert computer-formatted data to a serial bit stream and vice versa.

JTAG interface 13a may also be referred to an IEEE 1149.1 interface, which identifies the IEEE standard with which it substantially complies. As is standard, JTAG interface 13a has at least five pins: test data input (TDI), test data output (TDO), test mode select (TMS), test clock (TCK), and test reset (TRST).

Emulator 13 provides various emulation functions. In the example of this description, it provides two modes of operation. In its real-time mode, if a break event occurs, the main body of the program code halts execution but time-critical interrupts can still be serviced. In its "stop" mode, all interrupts are disabled.

Emulator 13 is a DMA (direct memory access) emulator. In other words, it uses DMA accesses directly to the registers and other memory of CPU 14. This permits the debugger on host 11 to gain direct access to the contents of the memory. To this end, the emulator 13 takes control of the memory interface during unused cycles of the instruction pipeline. Thus, the CPU's memory may be monitored without requiring processor resources. It is an alternative to scanning the storage elements in the CPU. In the example of this description, the DMA logic associated with emulator 13 detects unused bus cycles to gain access to memory. The emulator 13 can thus read and write to memory of CPU 14 and monitor CPU 14 without affecting the operation of the target application code.

The DMA function of emulator 13, as well as its other functions, may be implemented with logic circuitry. As explained below in connection with FIGS. 2–7, a number of emulator functions are implemented with various "debug modules" that are part of emulator 13. One such module is a "reconfigurable datapath" 13b, that is, a datapath that may be reconfigured so as to be capable of performing different emulator functions. As explained below, a single datapath 13b may be reconfigured so as to permit processor 10 to switch between various debug modes.

The appropriate circuits for each mode are activated by writing into a configuration register 13c. This reconfiguration may occur "on the fly" as an emulation process is occurring. The reconfiguration may occur in response to commands from debugger 11. Even in the absence of a debugger, CPU 14 might have an operating system that permits "self debug" functions to be performed through code running on CPU 14.

CPU 14 has conventional processing elements. It has a memory interface for transferring data and control signals between CPU 14 and associated memory. It has connections for other signals, such as for clock and control signals, and reset and interrupt signals, as well as for signals to and from emulator 13.

As indicated in FIG. 1, emulator 13 and CPU 14 may be integrated on the same integrated circuit device. An example of such a device is one made from the T320C2700, a digital processing core available from Texas Instruments Incorporated. However, the same concepts can be extended to CPU's whose emulation logic is not integrated on-chip, in which case, emulator 13 could be implemented with additional software or with off-chip hardware.

Datapath Modes

FIGS. 2–5 illustrate various configurations into which the reconfigurable datapath 13b of emulator 13 may be configured. Each configuration is identified by the general reference to the datapath 13b, as well as by a reference to its specific application, e.g., a breakpoint mode configuration 13b (20), counter mode configurations 13b (30a)–13b (30b), DMA mode configuration 13b (40), and PSA mode configuration 13b (50).

Each configuration 13b (20)–13b (50) has two registers, an address/data reference (REF) register 21 and an address/data mask register (MSK) 22. In the example of this description, REF register 21 and MSK register 22 are 32-bit registers. Registers 21 and 22 are made from a register bitcell unit 60. The register bitcells are described below in connection with FIG. 6. As shown in FIG. 6, but not explicitly shown in FIGS. 2–5, each register 21 and 22 may be written from processor memory and read to processor memory.

Each configuration 13b (20)–13b (50) also has comparator logic 25. Comparator logic 25 is made from a comparator bitcell unit 70. The comparator bitcells are described below in connection with FIG. 7.

Both the register bitcell unit 60 and the comparator bitcell unit 70 have additional combinatorial logic circuitry. The available circuitry is illustrated in FIG. 6 for the register bitcell unit 60 and in FIG. 7 for the comparator bitcell unit 70. For each configuration 13b (20)–13b (50), FIGS. 2–5 illustrate the logic that is used for that configuration. Thus, the interconnections of the bitcells within units 60 and 70 and the selection of appropriate inputs to them permit their reuse for each of the different modes.

Figure 2:
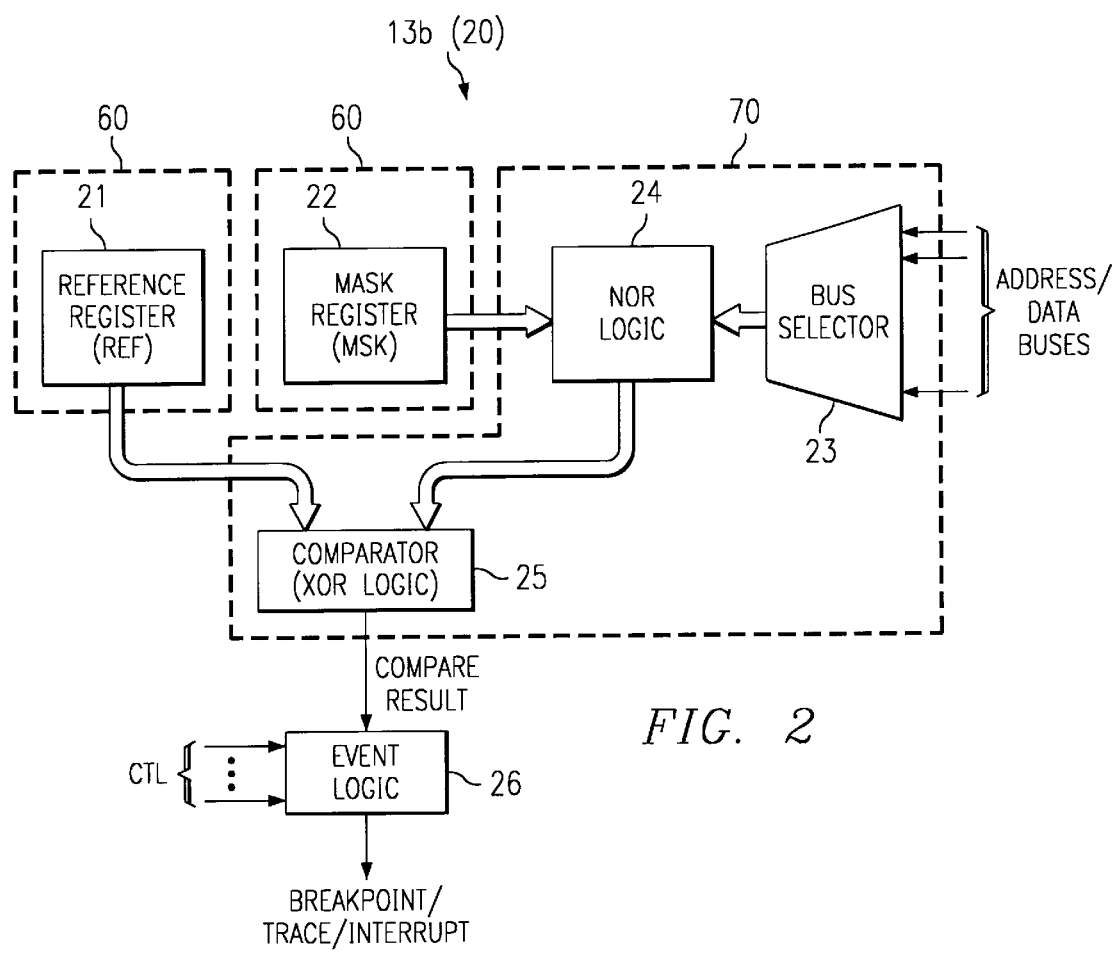
FIG. 2 is a block diagram of the reconfigurable datapath configured in a breakpoint mode.

FIG. 2 illustrates the reconfigurable datapath 13b in a breakpoint configuration 20. Breakpoints are addresses, supplied by the developer, at which the program being developed will stop automatically. Using breakpoints, the developer can examine the contents of registers or other memory.

For the breakpoint configuration 20, datapath 13b uses REF register 21 and MSK register 22. It also uses bus selector 23, NOR logic 24, comparator 25, which are part of the comparator bitcell unit 70.

The breakpoint function monitors the program address bus, and compares its contents against a reference address using a bit mask value to indicate bits to be ignored. The reference address represents the point in the application code that a developer has designated as a breakpoint.

In an alternative configuration, the breakpoint function monitors a certain memory location and stops the application program if a current instruction reads or writes to that location. In this case, the memory location is the reference address.

In general, the breakpoint configuration 20 involves comparing an address associated with the application code to a reference address. Bus selector 23 selects the correct bus, in accordance with parameters stored in configuration register 13c.

The MSK register 22 permits the reference address to be masked. As an example of masking provided by register 22, a hardware breakpoint could be placed on the address range 0002000$_{16}$ to 0002FF$_{16}$ by specifying the following binary mask address, where the eight LSBs are don't cares:

00 0000 0000 0010 xxxx xxxx

Where the reference address represents an address of an instruction of the application program, as a result of masking, the application code would halt at any one of the associated instructions in the specified range.

The mask value and the bus input are input to NOR logic 24, and the output delivered to comparator 25. Comparator 25 compares the masked bus value with the reference value.

Event qualifier logic 26 may be used to provide alternative events if there is a match to the reference address. In addition to stopping execution of the application code, an interrupt may be generated. Or, a trace can be provided, that is, a pulse can be output to an output pin, which can be connected to an oscilloscope or other tracing device.

Figure 3A:
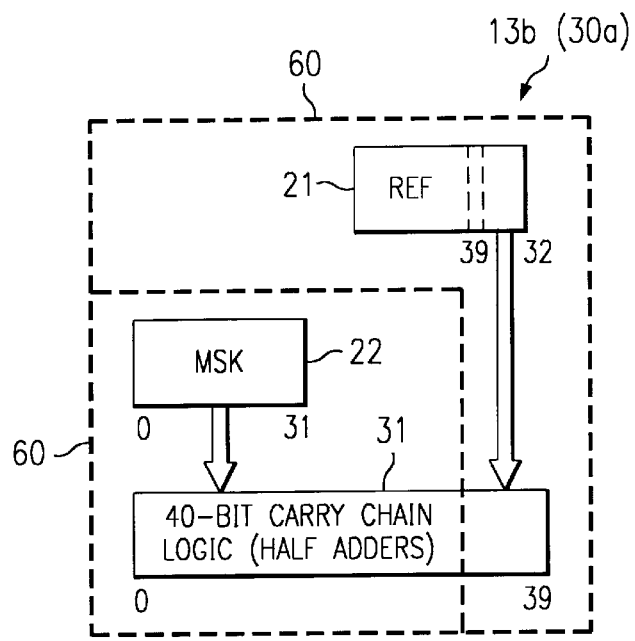
FIGS. 3A–3C are block diagrams of the reconfigurable datapath configured in a 40-bit, 32-bit, a dual 16-bit counter modes, respectively.
Figure 3B:
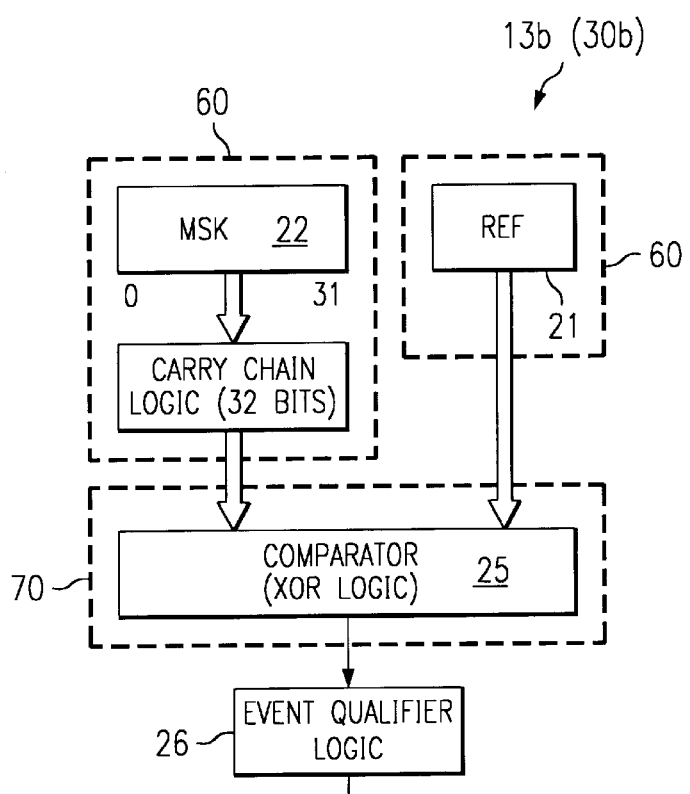
Figure 3C:
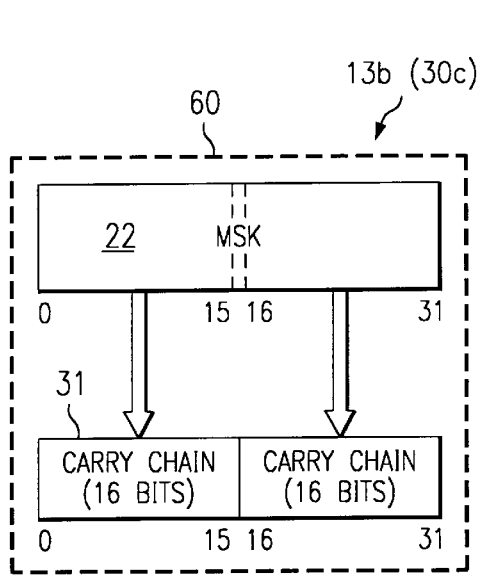

FIG. 3A—3C illustrate variations of a benchmark counter configuration 13b (30a)–13b (30c). The benchmark function permits debugger 11 to keep track of the number of CPU clock cycles consumed by a particular section of code.

FIG. 3A illustrates datapath 13b in a 40-bit counter configuration 13b (30a). Bits 0 to 31 are from the MSK register 22. Bits 32 to 39 are from the REF register 21. In other embodiments, the role of the two registers 21 and 22 could be reversed. A carry chain 31 is used to increment the count.

Both the REF register 21 and the MSK register 22 as well as their associated carry chain logic are made from register bitcell units 60. In the 40-bit counter mode, comparator 25 is idle.

FIG. 3B illustrates datapath 13b in a 32-bit benchmark counter configuration 13b (30b). Only one register, here MSK register 22, is used for the count and all bits come from that register. MSK register 22 and its associated carry chain logic is made from a register bitcell unit 60.

As illustrated in FIG. 3B, the 32-bit counter mode may be enhanced with compare and event generation functions. A reference count is stored in REF register 21. Comparator 24 compares a reference count from REF register 21 to the count from MSK register 22. Like MASK register 22, REF register 21 is.made from a register bitcell unit,60, but does not use carry chain logic. The result of the comparison is delivered to event qualifier logic 26, which generates an event, such as a break or interrupt. This 32-bit counter configuration 30b can be used to implement a watchdog timer.

FIG. 3C illustrates datapath 13b in a dual 16-bit benchmark counter configuration 30c. Bits 0–15 of the MSK register 22 are used for a first counter, and bits 16–31 are used for second counter. The carry chain logic 31 is configured to provide two separate 16-bit chains. The MSK register 22 and its carry chain logic 31 are made from a register bitcell unit 60.

The two 16-bit counters of FIG. 3C could be used with compare and event functions in a manner similar to that illustrated in FIG. 3B. To this end, two reference counts would be stored in REF register 21. The reference counts and the outputs of the two 16-bit counters would be connected to comparator 25, which compares two pairs of 16-bit values. The comparator output would be connected to event qualifier logic 26. In case of the 16-bit counter, two independent interrupts can be generated.

The datapath unit 13b of FIG. 2 (breakpoint configuration 30) and the datapath unit 13b of FIGS. 3A, 3B or 3C (counter configurations 30a–30b) can be combined in tandem to generate an event if a certain address is not seen on the address bus within a certain number of CPU clock cycles. The breakpoint configuration 13b (20) is used to generate an event when the specified address appears. It sends the event to the counter configuration 13b (30a–30c), which generates an event when a reference count matches the actual count but restarts when the breakpoint unit sends it an event.

Figure 4:
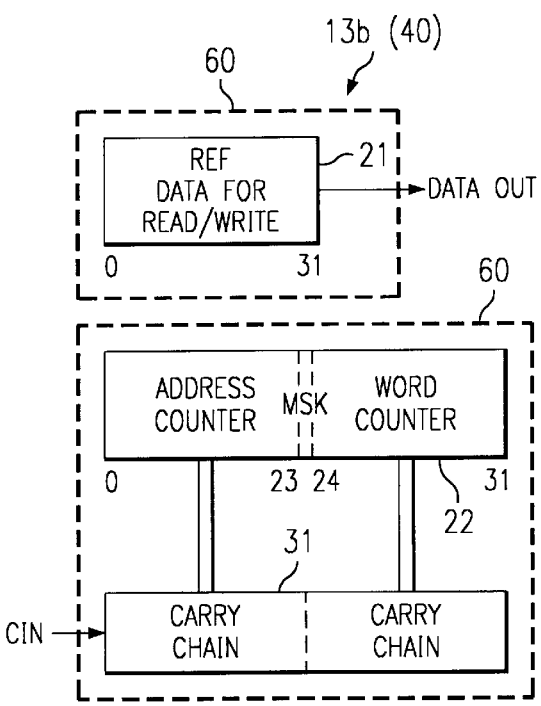
FIG. 4 is a block diagram of the reconfigurable datapath configured in a DMA mode.

FIG. 4 illustrates datapath 13b in a DMA configuration 40. The DMA mode provides access to CPU memory and registers, including memory-mapped registers such as emulation registers and peripheral registers, without direct CPU intervention. Because the DMA function uses the same memory access mechanism as does CPU 14, any read or write access that CPU 14 can perform in a single operation can be performed by the DMA function. The DMA function presents an address (and data in the case of a write) to CPU 14, which performs the operation during an unused bus cycle. Once CPU 14 has obtained the desired data, it is presented back to the DMA function.

Bits 0 to 23 of the MSK register 22 are address counter bits, and bits 24 to 31 are word counter bits. In the example of this description, the address counter bits are increased by 2 because DMA is done in 2-word packets. MSK register 22 and carry chain logic are used in a manner similar to their use for the counter modes of FIG. 3A–3C. However, for the DMA mode, carry chain 31 is configured to act as two carry chains of different lengths.

REF register 21 stores a data value for read and write operations. In the DMA configuration 40, as the memory addresses are incremented, data is read from or written to memory. MSK register 22 generates addresses and keeps track of the number of words moved. The last bit of REF register 21 may be connected to a serial export pin. Both REF register 21 is made from a register bitcell unit 60, as are MSK register 22 and its associated carry logic 31.

The comparator 25 (used for the benchmark and some counter modes) is generally idle for the DMA configuration 40. However, during serial data export, comparator 25 is used to build a shift chain. A PSA configuration described below in connection with FIG. 5 is used, with a 0 forced into one comparator input, making comparator 25 act as a serial shifter.

Carry chain 31 has a carry input. signal, cin, that controls whether the count is by 2 or 1 or 0. For example, to count by 0, a carry input of 0 is delivered to the first carry cell. To count by 1, a carry input of 1 is delivered to the first carry cell. To count by 2, a carry input of 1 is delivered to the second carry cell.

DMA is controlled (begun and ended) using configuration register 13c. DMA can be programmed to stop when the word counter overflows or upon the occurrence of an event generated by another unit. DMA can also be explicitly stopped by writing to the configuration register 13c.

Figure 5:
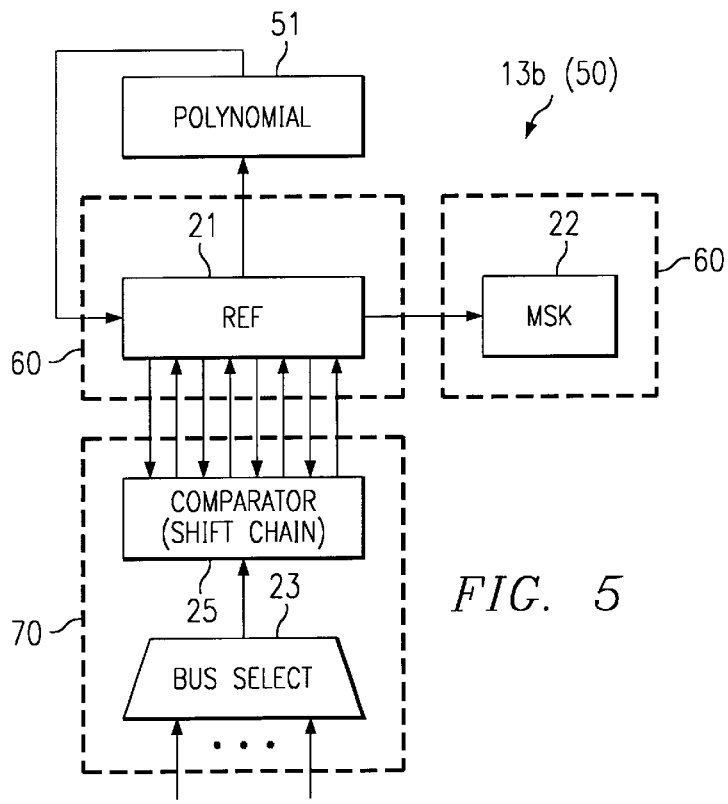
FIG. 5 is a block diagram of the reconfigurable datapath configured in a PSA mode.
Figure 6:
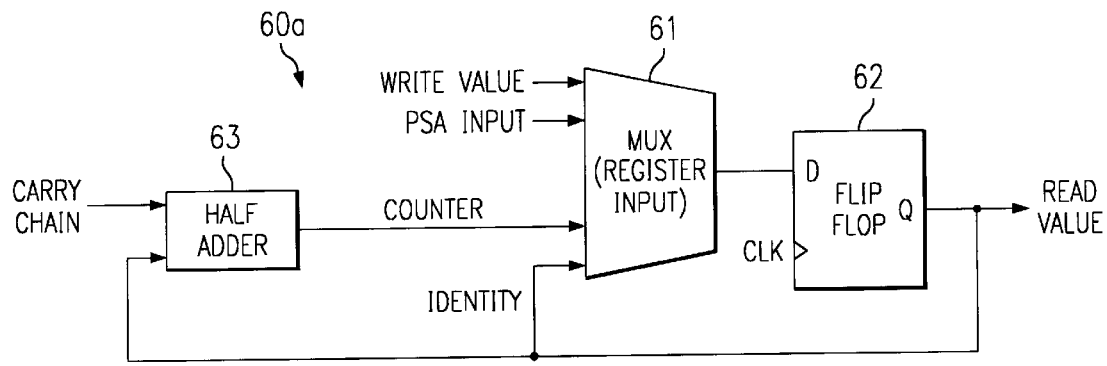
FIG. 6 illustrates a single bitcell used to build the register bitcell units of FIGS. 2–5.

FIG. 5 illustrates datapath 13b in a parallel signature analysis (PSA) configuration 50. In the PSA mode, the datapath 13b functions as a linear feedback shift register (LFSR). The PSA is implemented with datapath 13b and additional logic 51 that computes a polynomial that is fed into the input of the lowest comparator bitcell.

Bits 0–31 are stored in REF register 22, and bits 32–39 are stored in MSK register 21. Comparator 25 is configured as an XOR shift chain. A value from REF register 21 and a value selected by bus selector 23 are compared. There are a number of empty shifts (bits 32 to 39) where there is no XOR between the registers. Thus, the chain is: psain, register, XOR, register . . . register, XOR. A feedback term, psain, goes to the REF register 21. The result of the PSA function is a 40-bit PSA polynomial, which is read out from REF register 21 and MSK register 22. REF register 21 and MSK register 22 are made from register bitcell units 60. Comparator 25 (configured as a shift chain) is made from a comparator bitcell unit 70.

Datapath Bitcells

FIG. 6 illustrates a single register bitcell 60a, a number of which comprise a register bitcell unit 60. Bitcells 60a are used to implement the register and carry chain functions described above. For the carry chain function, the half adder 63 receives a value from flip-flop 62 and a value from a previous bitcell 60a and outputs the sum bit.

Multiplexer 61 selects between the following inputs: register write, PSA or shift, counter, or identity (hold register value). An implicit select of none of the above elements is used to clear the bitcell 60a. Controls and corresponding data inputs are omitted if not used for a particular mode.

For the breakpoint configuration 20, REF register 21 and MSK register 22 use the identity input. For the 40-bit counter configuration 30a, REF register 21 and MSK register 22 use the counter inputs, except for the unused portion of the REF register 21, which uses the identity input. For the DMA configuration 40, REF register 21 uses the write input and MSK register 22 uses the counter input. For the PSA configuration 50, REF register 21 and MSK register 22 receive the PSA input.

Figure 7:
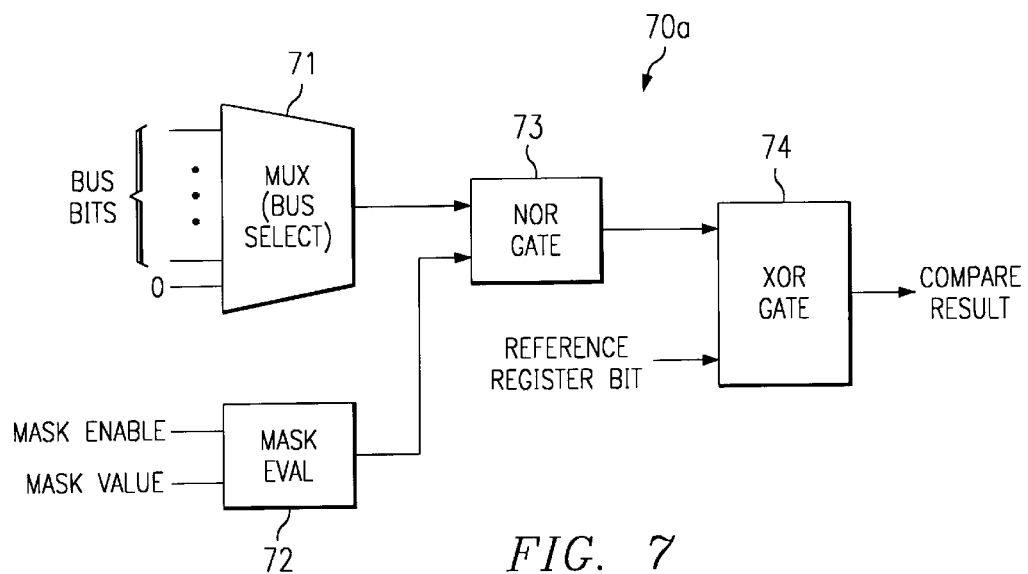
FIG. 7 illustrates a single bitcell used to build the comparator:bitcell unit of FIGS. 2–5.

FIG. 7 illustrates a single comparator bitcell 70a, a number of which comprise a comparator bitcell unit 70. The comparator bitcells 70a are used to implement bus selector 23, NOR logic 24, and comparator 25.

For the bus selector 23, each bitcell 70a has a multiplexer 71 that selects between various bus inputs and a constant zero value.

For the NOR logic, a mask evaluator 72 receives an enable bit and a mask value, and permits the bus bit value to be conditionally masked. A NOR gate 73 receives the output of multiplexer 71 and mask evaluator 72.

The output of NOR gate 73 is delivered to XOR gate 74, which compares the masked bus bit and a corresponding reference register bit from REF register 21. The output of XOR gate 74 is the compare result signal illustrated in FIG. 2 (benchmark mode) and FIG. 3B (32-bit counter mode).

It should be understood that the NOR and OR logic of comparator 25, including NOR gate 73 and XOR gate 74, could be implemented with a wide variety of logic devices. For example, the NOR and XOR functions could be implemented with NAND and XNOR logic using simple boolean logic transformations. Thus, for purposes of this description, the terms "NOR logic" and "XOR logic" include not only the discrete logic devices conventionally associated with those functions, but any other or additional devices that implement the same logic functions. For purposes of this description, the combination of NOR and XOR logic could be equivalently implemented with many different arrangements of gates and are still referred to as "NOR logic" and "XOR logic".

By using the mask enable input to mask evaluator 72 or a zero constant to multiplexer 71, comparator bitcell 70a may be configured for use in various modes. For use as a pure comparator, an appropriate address/data bus is selected and the mask enable is on. This would be the case for the breakpoint configuration 20 of FIG. 2. For use as a shifter for serial export of DMA data in the DMA configuration 40 of FIG. 4, a constant zero is selected and the mask enable is off. For LFSR (linear feedback shift register) shifter logic for the PSA configuration 50 of FIG. 5, the appropriate address/data bus is selected and the mask enable is off.

Reconfiguration Register

As stated above in connection with FIG. 1, datapath 13b is reconfigured into various modes by writing to reconfiguration register 13c. This register is memory mapped and is accessible by both the application code running on CPU 14 and the debugger 11. Register 13c holds the current mode of operation, the state of the datapath 13b in this mode, and mode-specific selection bits. For example, a state might be "count completed" for the counter configuration 30. A mode selection bit might be an event qualifier bit for the breakpoint configuration 20.

Other Embodiments

Although the present invention has been described in detail, it should be understood that various changes, substitutions, and alterations can be made hereto without departing from the spirit and scope of the invention as defined by the appended claims.

What is claimed is:

1. A reconfigurable datapath operable to alternatively perform various debug functions, comprising:
   a first set of register bitcells that form a reference register bitcell unit;
   a second set of register bitcells that form a mask register bitcell unit;
   wherein each of said register bitcells has a half adder, a register input multiplexer for selecting between a number of inputs, at least one said input being a counter input from said half adder and at least one input being a write input, and a flip flop for storing a selected one of said inputs, and wherein said half adder receives a carry chain input and the output of said flip-flop; and
   a set of comparator bitcells that form a comparator bitcell unit, each of said comparator bitcells having NOR logic for receiving a bus input and a mask input, and XOR logic that receives the output of said NOR gate and a signal from said reference register unit and provides a compare result signal.

2. The datapath of claim 1, wherein said register input multiplexer further receives an identity input from said flip-flop.

3. The datapath of claim 1, wherein said register input multiplexer further receives a PSA input.

4. The datapath of claim 1, wherein said processor has a number of buses and wherein each of said comparator bitcells has a bus select multiplexer for selecting among said buses to provide said bus input to said NOR logic.

5. The datapath of claim 1, wherein each of said comparator bitcells has a bus select multiplexer for selecting between one or more bus values, one of said bus values being a constant zero value, to provide said bus input to said NOR logic.

6. The datapath of claim 1, wherein each of said comparator bitcells has a mask evaluator that receives said mask input for delivery to said NOR logic.

7. The datapath of claim 1, further comprising event logic that receives said compare result signal.

8. The datapath of claim 1, wherein said comparator bitcell unit is operable to provide a shift chain.

9. The datapath of claim 1, wherein said reference register bitcell unit, said mask register bitcell unit, and said comparator bitcell unit are configured for a breakpoint mode.

10. The datapath of claim 1, wherein said reference register bitcell unit and said mask register bitcell unit are configured in a counter mode that uses both said bitcell units for a count value.

11. The datapath of claim 1, wherein one of said register bitcell units is configured in a counter mode that uses said bitcell unit for a count value.

12. The datapath of claim 11, wherein the other of said register bitcell units stores a reference count and said comparator bitcell unit compares said reference count and said count value.

13. The datapath of claim 1, wherein one of said bitcells unit is configured in a counter mode that uses said bitcell unit for more than one count value.

14. The datapath of claim 1, wherein said reference register bitcell unit, said mask register bitcell unit, and said comparator bitcell unit are configured for a DMA mode.

15. The datapath of claim 1, wherein said reference register bitcell unit, said mask register bitcell unit, and said comparator bitcell unit are configured for a PSA mode.

16. The datapath of claim 1, wherein said NOR logic is implemented with at least one NOR gate.

17. The datapath of claim 1, wherein said NOR logic is implemented with logic circuitry equivalent to at least one NOR gate.

18. The datapath of claim 1, wherein said XOR logic is implemented with at least one XOR gate.

19. The datapath of claim 1, wherein said XOR logic is implemented with logic circuitry equivalent to at least one XOR gate.

20. The datapath of claim 1, wherein said NOR logic and said XOR logic are implemented with logic circuitry containing a number of logic gates.

21. A method of using a processor to alternatively perform one of a number of self-debug functions, comprising the steps of:

accessing a reconfigurable datapath, said datapath having the following elements: first set of register bitcells that form a reference register bitcell unit; a second set of register bitcells that form a mask register bitcell unit; wherein each of said register bitcells has a half adder, a register input multiplexer for selecting between a number of inputs, at least one said input being a counter input from said half adder and at least one input being a write input, and a flip flop for storing a selected one of said inputs, and wherein said half adder receives a carry chain input and the output of said flip-flop; and a set of comparator bitcells that form a comparator bitcell unit, each of said comparator bitcells having NOR logic for receiving a bus input and a mask input, and XOR logic that receives the output of said NOR gate and a signal from said reference register unit and provides a compare result signal; and providing interconnections and inputs to said datapath appropriate for a desired one of said debug functions.

22. The datapath of claim 21, wherein said NOR logic is implemented with at least one NOR gate.

23. The datapath of claim 21, wherein said NOR logic is implemented with logic circuitry equivalent to at least one NOR gate.

24. The datapath of claim 21, wherein said XOR logic is implemented with at least one XOR gate.

25. The datapath of claim 21, wherein said XOR logic is implemented with logic circuitry equivalent to at least one XOR gate.

26. The datapath of claim 21, wherein said NOR logic and said XOR logic are implemented with logic circuitry containing a number of logic gates.

27. A self-debug unit for a processor, comprising:

a reconfigurable datapath, said datapath having the following elements: first set of register bitcells that form a reference register bitcell unit; a second set of register bitcells that form a mask register bitcell unit; wherein each of said register bitcells has a half adder, a register input multiplexer for selecting between a number of inputs, at least one said input being a counter input from said half adder and at least one input being a write input, and a flip flop for storing a selected one of said inputs, and wherein said half adder receives a carry chain input and the output of said flip-flop; and a set of comparator bitcells that form a comparator bitcell unit, each of said comparator bitcells having NOR logic for receiving a bus input and a mask input, and XOR logic that receives the output of said NOR gate and a signal from said reference register unit and provides a compare result signal; and a reconfiguration register accessible by said processor for storing parameters that determine a debug configuration of said datapath.

28. The datapath of claim 27, wherein said NOR logic is implemented with at least one NOR gate.

29. The datapath of claim 27, wherein said NOR logic is implemented with logic circuitry equivalent to at least one NOR gate.

30. The datapath of claim 27, wherein said XOR logic is implemented with at least one XOR gate.

31. The datapath of claim 27, wherein said XOR logic is implemented with logic circuitry equivalent to at least one XOR gate.

32. The datapath of claim 27, wherein said NOR logic and said XOR logic are implemented with logic circuitry containing a number of logic gates.

* * * * *